Oct. 27, 1964        A. D. McLEAN        3,154,321
AIR-RIDE TRUCK SUSPENSION
Filed June 30, 1960        4 Sheets-Sheet 1
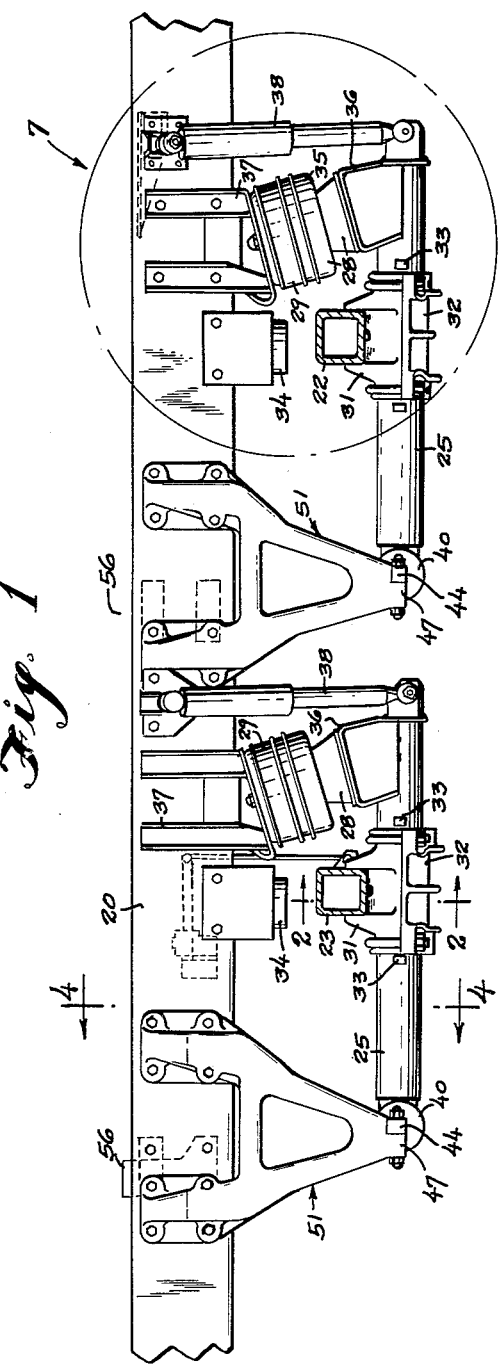
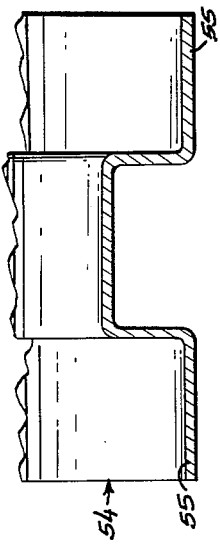
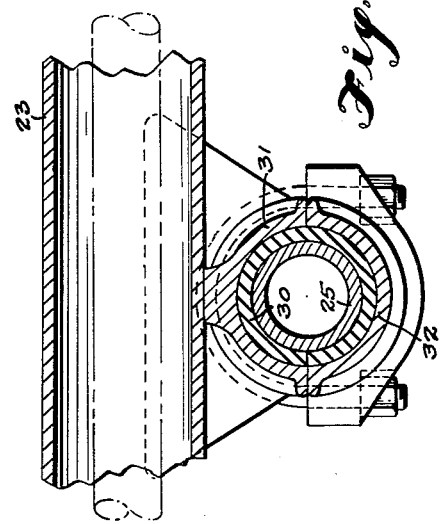
INVENTOR.
Allan D. McLean
BY
ATTORNEYS

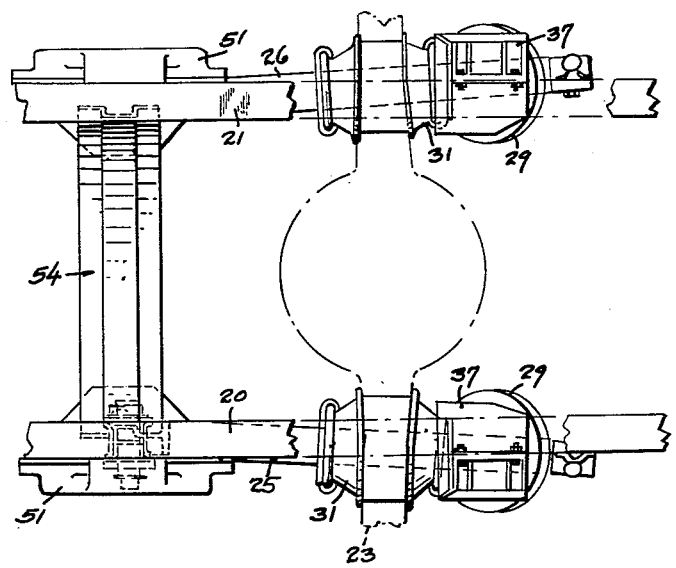
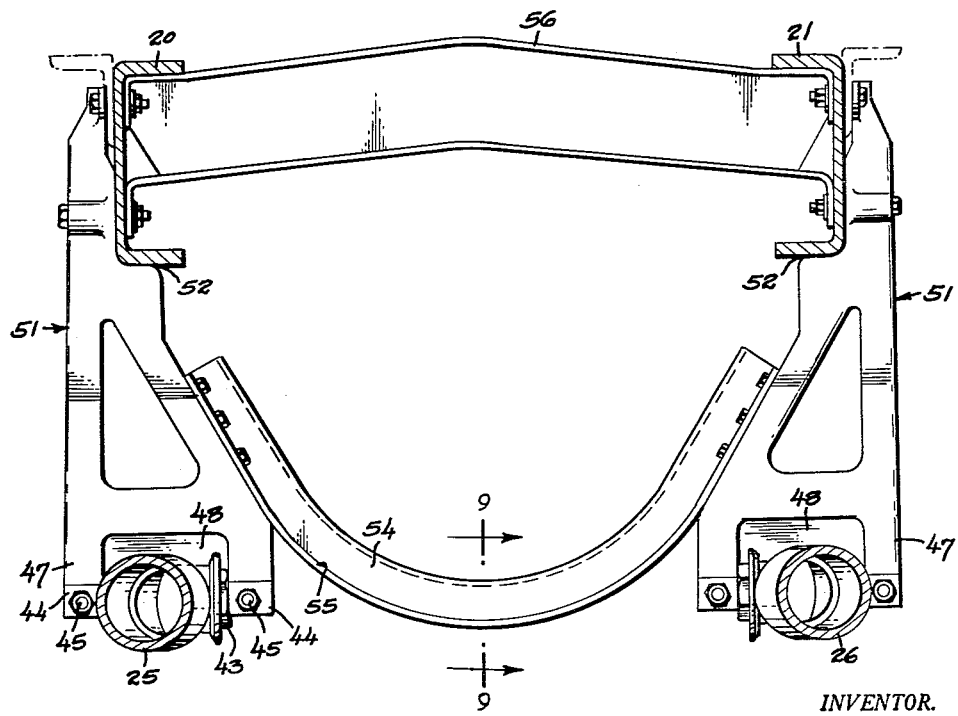

Oct. 27, 1964  A. D. McLEAN  3,154,321
AIR-RIDE TRUCK SUSPENSION
Filed June 30, 1960  4 Sheets-Sheet 4

INVENTOR.
Allan D. McLean
BY
ATTORNEYS

United States Patent Office 3,154,321
Patented Oct. 27, 1964

3,154,321
AIR-RIDE TRUCK SUSPENSION
Allan D. McLean, Seattle, Wash., assignor to Pacific Car and Foundry Company, a corporation of Washington
Filed June 30, 1960, Ser. No. 39,979
7 Claims. (Cl. 280—124)

This invention relates to vehicle suspensions, particularly a suspension in which a compressed body of air performs the principal springing function, and is a continuation-in-part of my pending application Ser. No. 810,826, filed May 4, 1959, and now abandoned. The suspension of the present invention is engineered for use with single or dual rear axle truck or trailer constructions, whether the single rear axle or one or both dual rear axles are or are not driven axles. Generally stated the suspension system of the present invention is one in which there is provided for each rear axle at each side of the vehicle a respective air spring interposed between the vehicle frame and the rear end of a beam extending longitudinally of the vehicle, said rear end being free while the front end is hinged. The hinge is carried by the vehicle frame, and a related end of the concerned axle is attached to said free end of the beam. Elastic rubber is incorporated in both the attachment of the beam to the frame and the attachment of the beam to the axle. Axle forces in all directions are controlled through rubber damping and compression. Such control of movement through rubber imposes upon the axle a resistance torsion effect when either end of the axle is subjected to vertical motion.

In designing the suspension of a truck or trailer it is necessary that there be provided not only a sufficient vertical cushioning to insure a proper riding condition but the suspension must also have an in-built ability to resist sway due to high center of gravity loads on curves, rough roads, etc. This resistance to sway must be a function of the torsional rigidity of the axle housing and axle attaching members to the frame construction itself, but it becomes important not only for riding comfort but also for a minimizing of destructive stresses in the beams that lateral stability not be obtained at the expense of flexibility.

The present invention proposes to provide an air-spring suspension insuring the proper amount of torsional resistance to counter sway, and yet precluding such looseness torsionally as would cause an unsteady condition to prevail on curves.

The invention furthermore aims to provide an air-ride spring suspension which will effectively resist torque reactions on the axle housing, generally termed "hop," as driving and braking forces are passed into the frame.

As a further object still, the invention aims to provide an air-ride spring suspension which will produce in the forward motion of the vehicle a steering effect of the axles on the frame.

With the above objects and advantages in view and otherwise generally aiming to perfect a suspension of the air-spring type through provision of simplified design, advanced riding qualities, improved support, better handling, and minimum maintenance, the invention consists in the novel construction and in the adaptation and combination of parts hereinafter described and claimed.

In the accompanying drawings:

FIGURE 1 is a fragmentary longitudinal vertical sectional view portraying an air-ride suspension system constructed to embody the preferred teachings of the present invention, the plane on which the section is taken lying exteriorly of the vehicle frame.

FIG. 2 is a fragmentary transverse vertical sectional view drawn to an enlarged scale on line 2—2 of FIG. 1.

FIG. 3 is a fragmentary top plan view of the suspension, with the axle housing shown in phantom.

FIG. 4 is a transverse vertical sectional view drawn on line 4—4 of FIG. 1, the scale being larger than that of FIG. 1 but yet reduced from the scale used in FIG. 2.

FIG. 9 is an enlarged-scale longitudinal vertical sectional view on line 9—9 of FIG. 4.

With reference being had to FIGS. 1 and 3 of the drawings, there is represented the rear end portion of a vehicle main frame that includes transversely spaced apart longitudinal principals designated by the numerals 20 and 21. While I have here shown a tandem rear axle assembly, the teachings of the present invention apply as well to a single rear axle vehicle. I apply to the aft rear axle housing 22, for its suspension, a substantial duplicate of suspension mechanisms applied to the forward rear axle housing 23, and a description of the one will thus suffice for the other. Axles housed in the axle housings are or may be live in each instance, and ground wheels (not shown) carried upon the ends of the axles are or may be individually braked.

Figure 5:
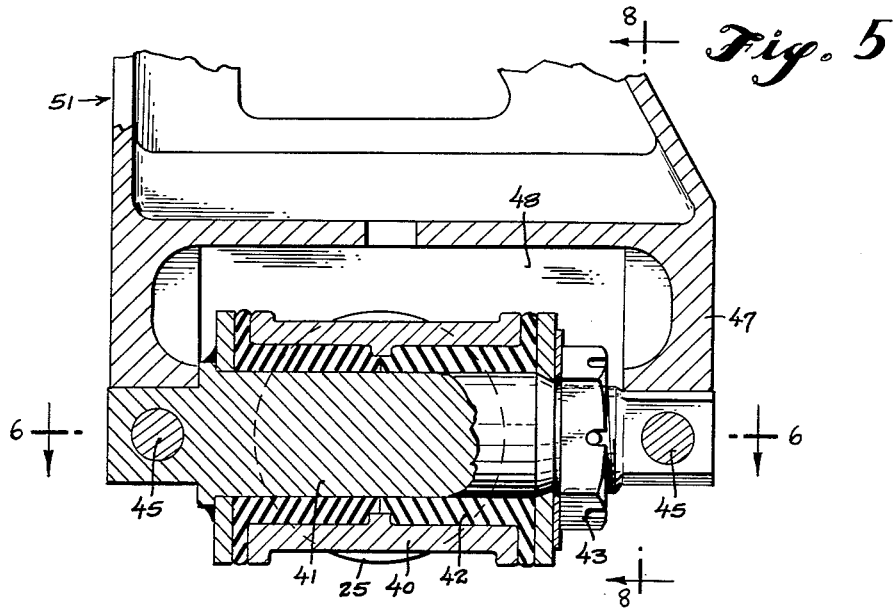
FIG. 5 is a fragmentary transverse vertical sectional view drawn on line 5—5 of FIG. 8 and employing a yet larger scale than that of FIG. 2.
Figure 6:
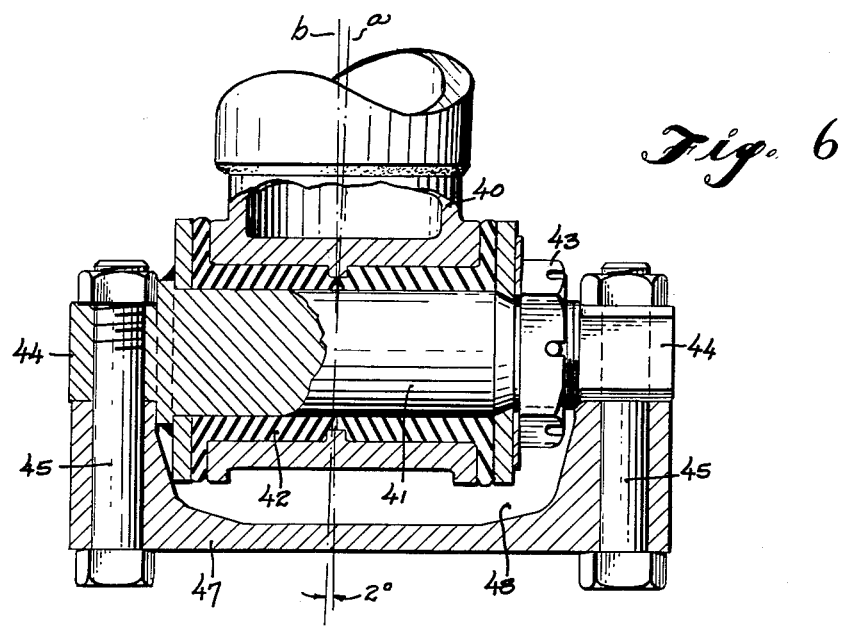
FIG. 6 is a fragmentary horizontal sectional view drawn on line 6—6 of FIG. 5.

According to the present invention, each end of the axle housing 22 or 23, as the case may be, overlies and is made secure to a respective one of two beams 25 and 26. The point at which attachment is made with the axle lies intermediate the ends of the concerned beam, and each such beam, at its extreme front end, is connected to the frame. This front end or frame connection is placed so as to occupy a horizontal plane closely approximating the horizontal plane occupied by the axle. Each beam is furthermore particularly characterized in that its said frame connection lies in closer proximity than does its axle connection to the longitudinal median line of the vehicle, thereby giving to the attaching beams 25 and 26 a splayed effect when viewed either from above or below. I find that a 2° deviation between the beam's axial line, represented by the letter $a$, and a line $b$ paralleling the longitudinal median line of the vehicle (see FIG. 6) provides in the forward motion of the vehicle an ideal trailing condition producing a steering effect of the axles on the frame as the vehicle negotiates curves. The slow speed to which a vehicle is subject when backing makes the adverse effect, in reverse, of no concern.

For their axle attachment the beams are each trapped by a split resilient rubber bushing 30 compressed between a block 31 saddling the beam and its complement in a cap 32. The block is restrained against endwise motion upon the beam by nodular stops 33, and is made integral with the axle housing by a weld connection. Each frame principal presents a respective cushion stop 34 overlying the axle housing.

Figure 7:
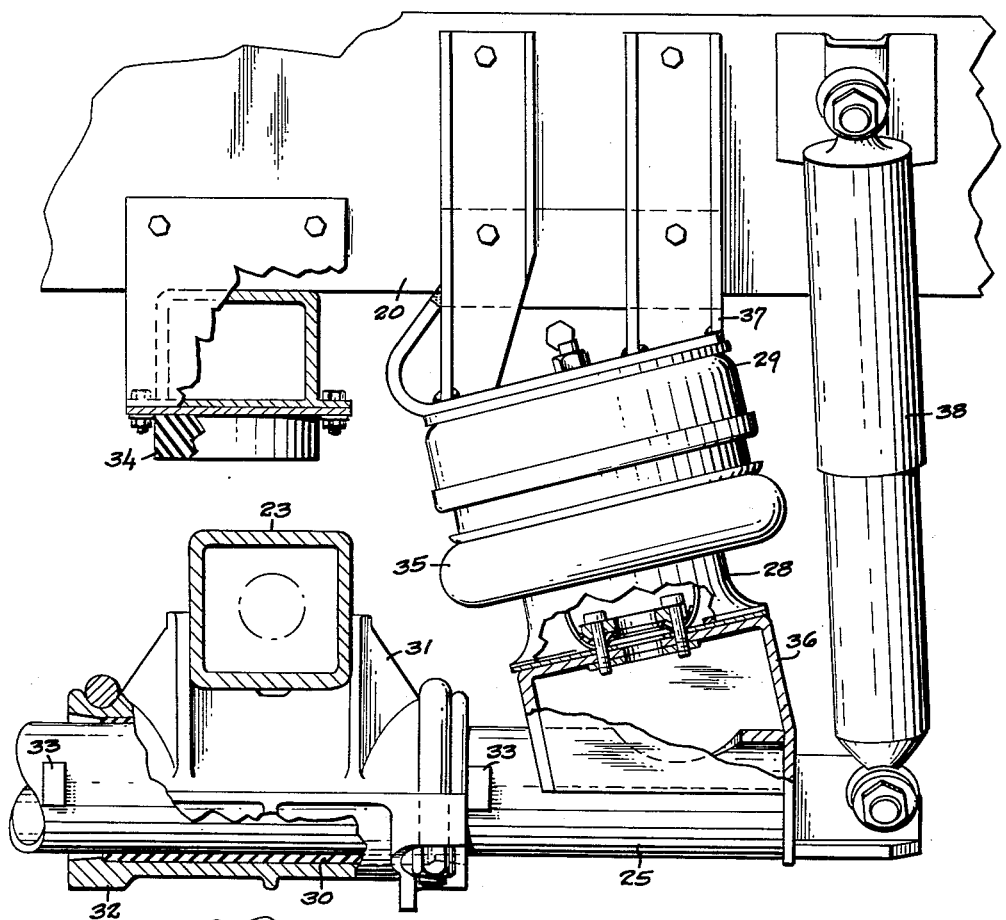
FIG. 7 is a detail blow-up of the structure circled at "7" in FIG. 1, with parts broken away and in section

The air spring used in the present assembly is or may be conventional. The structure here illustrated presents a sealed chamber composed of telescopically associated inner and outer sections 28 and 29 attached one to the beam and the other to the vehicle frame and interconnected by an elastic sealing muff 35 arranged to roll and unroll itself along the external surface of the inner cup section as air sealed within the chamber expands and contracts under force of changing compression loads. A seat 36 to which the cup section 28 is attached is welded to the beam as an integral adjunct thereof, occupying a position proximal to said axle attachment between the axle attachment and the free end of the beam. The seat 36 and a complementing bracket 37 which provides a frame mounting for the outer cup sections 29 are each so positioned that the axial line along which telescoping motion develops occurs more or less on the approximate arc of a circle taken about the hinge axis of the beam as a center. A shock absorber 38 desirably extends between beam and frame at the beam's extreme rear end. The beams are hollow, desirably tubular in shape, with the ends closed, and each such beam, see FIG. 7, serves as an air cushioning chamber in that its hollow interior directly communicates with the interior air chamber of the air spring.

Figure 8:
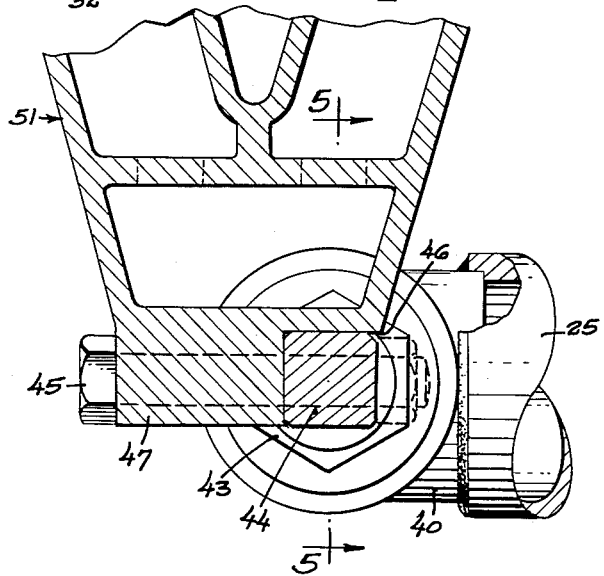
FIG. 8 is a fragmentary longitudinal vertical sectional view on line 8—8 of FIG. 5.

Reverting now to the beam's said hinge connection, it will be seen that each beam has an eye fitting 40 welded to its front end. The eye of this fitting extends transversely of the beam with its axis horizontal and normal to the longitudinal median line of the vehicle. A trunnion 41 is received through the eye, being surrounded by a compressed bushing 42 of elastic rubber. Compression is accomplished by end pressure exerted from a nut 43 threaded on the trunnion. Projecting ends 44 of the trunnion are square in section and have two diametrically opposite flats traversed by drill holes. The squared ends lodge in downwardly facing angle sockets 46 (see FIG. 8) provided by brackets 47 hung from the frame, the brackets being suggestive of a yoke when viewed from the aft end of the beam in that the same provide a pocket 48 to accommodate the eye 40. The angle sockets 46 are formed in the two walls which flank this pocket, and bolts 45 extend horizontally through these flanking walls to secure each trunnion pin rigidly to the concerned bracket. As was previously noted it will be seen that the brackets 47 depend from the frame to such a degree that the trunnions occupy much the same horizontal plane as the axles, and preferably lie somewhat below said horizontal plane of the axles. It is this low positioning of the trunnions which resists the before-mentioned braking and driving torque reactions on the axle housing.

The brackets are made an integral part of a respective hanger denoted by 51. These hangers are bolted to the frame, one to the outside of one frame principal 20 and the other to the outside of the other frame principal 21. As viewed from the side, frame considered, each hanger has much the shape of an inverted letter A. In end elevation, or which is to say from a vantage point at the aft end of a beam, the profile configuration given to each hanger suggests a right triangle with the hypotenuse lying to the inside. Shelves 52 are provided to shoulder against the underside of the frame channels. Inwardly directed flanges are provided fore and aft of each hanger along such inner edges, and an inversely arched spanner member 54 of hat-section configuration is boltably connected by its flanges 55 to these hanger flanges. An upper cross-member 56 extends between the hangers in the substantial plane of the main frame. The significance of the described hanger-spanner affairs is that the vehicle's main frame, which perforce includes the usual cross-members in addition to the cross-members 56, is not made unduly stiff. The hat-section spanner 54 allows reasonable flexure as between the two channel principals of the main frame, yet effectively localizes the two low-level trunnions 41.

The suspension of the present invention requires no radius, track or torque rods. Independent sway bars are likewise eliminated. A sway-bar action is built-in, with the locating beams positioning the concerned axle both longitudinally and laterally. The restrained rubber (2 pivot point) connection, beam to hanger and beam to axle, minimizes structural stress on the beams without loss of lateral stability. With the two axle beam brackets permanently attached to the axle housing it is the two beams plus the axle housing that form the "built-in" sway bar and give the vehicle exceptional torsional stability.

The low "under-the-axle" mounting of the beams precludes what is commonly known as "axle hop." By reason of minimum driving and brake torque reactions, the frame structural members are subjected to a modicum of lift and load stresses. The generous length of the beams reduces to a minimum the longitudinal displacement of the axles in oscillation.

One inherent feature of the suspension is that there can be no weight transfer from one axle to the other within the permitted limit of oscillation (5½"). Loads with a high center of gravity pose no problem.

The present suspension will not under or over steer. Handling control becomes almost effortless. The unique design assures better tracking. A definite steering effect is induced on curves by the 2° axial line deviation, front and rear of the locating beams.

It is thought that the air-spring suspension of the present invention will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a vehicle having an axle sprung from the vehicle frame by air springs, the combination with the vehicle frame, the axle, and air springs: a respective beam disposed longitudinally of the vehicle at each side thereof having means at one end hingedly connecting the beam to the frame for swing movement of the beam about an approximate transverse horizontal axis fixed with respect to the frame, means attaching the related end of the axle to the beam at a point on the beam longitudinally removed from said hinge axis, and means provided upon the free end of the beam and by the frame acting in complement to support a respective air spring in an intervening position compressed between said beam and frame, the vehicle frame including laterally spaced apart longitudinal principals, the hinge means for each beam being supported by a respective hanger carried by a related said frame principal and depending well below the latter so as to locate the hinge axis on a level approximating the horizontal plane occupied by the axle, an integral connecting spanner being provided extending transversely of the vehicle from the hanger at one side to the hanger at the other side and having at least one portion disposed in the approximate horizontal plane occupied by the hinge means, said spanner being comprised of a substantially arched member.

2. Structure according to claim 1 having an upper integral cross-member extending horizontally in the approximate plane of the frame principals from the hanger at one side to the hanger at the other side of the vehicle.

3. In a vehicle having a through-axle sprung from the vehicle frame by air springs, the combination with the vehicle frame, the axle, and air springs: a respective beam disposed longitudinally of the vehicle at each side thereof having means at the front end hingedly connecting the beam to the frame for swing movement of the beam about an approximate transverse horizontal axis fixed with respect to the frame, means attaching the related end of the axle to the beam at a point on the beam rearwardly spaced from said hinge axis, and means provided upon the free end of the beam and by the frame acting in complement to support a respective air spring in an intervening position compressed between said beam and frame, the positioning of the beams being such that the attachment to the frame lies in closer proximity to the longitudinal median line of the vehicle than does the attachment to the axle, thus giving to the beams a splayed effect when viewed from above and locating the longitudinal median line of the beams at greater than 90° from the hinge axis of the respective beam, compressed bushings of elastic rubber being provided in the attachments so as to in the former instance yieldingly restrain the concerned beam against vertical swing motion about the hinge axis and in the latter instance yieldingly restrain the axle against twist motion relative to the concerned beam about the longitudinal center of the beam as an axis, torsional resistance imposed by said rubber bushings producing, from said beams and the axle, a built-in sway-bar.

4. Structure according to claim 3 in which each beam provides a hollow center in constant communication with the hollow interior of the related air spring so as to complement the latter as an air cushioning chamber.

5. In a vehicle having a through-axle and providing an air spring between said axle and the vehicle frame, a respective beam at each side of the vehicle attached at one end to a related end of the axle and extending therefrom longitudinally of the frame with its other end hingedly attached to the frame, said frame attachment comprising a transversely extending horizontal trunnion removably secured by each of its ends to a respective one of two transversely spaced yoke-arms provided by a frame-carried bracket and between said ends gripped by a bushing of elastic rubber compressed by end pressure between the trunnion and a surrounding eyed terminal fixed to the beam, said end pressure being exerted from a nut threaded upon the trunnion, the yoke arms presenting sockets to receive said ends of the trunnion characterized in that the same are open at the bottom so that the frame-attaching end of the beam together with its trunnion, the rubber bushing, and the nut compressing said bushing may be applied to and removed from the bracket intact and contained in the space between said yoke-arms of the bracket.

6. Structure according to claim 5 having hangers supporting said bracket and locating the same at a low level such that the horizontal plane occupied by the trunnions approximately coincides with the horizontal plane occupied by the axle.

7. Structure according to claim 5 characterized in that the frame attachments lie to the front and the two beams are so disposed as to give a splayed effect when viewed from above with the span across the frame attachments narrower than the span across the axle attachment, the hinge axis for each beam lying approximately normal to the longitudinal median line of the vehicle.

References Cited in the file of this patent

UNITED STATES PATENTS

| | | |
|---|---|---|
| 2,222,377 | Slack | Nov. 19, 1940 |
| 2,367,817 | Brown | Jan. 23, 1945 |
| 2,493,024 | Pointer | Jan. 3, 1950 |
| 2,653,035 | Ward | Sept. 22, 1953 |
| 2,713,498 | Brown | July 19, 1955 |
| 2,905,459 | Fikse | Sept. 22, 1959 |
| 2,905,460 | Van Wisen | Sept. 22, 1959 |
| 2,913,252 | Norrie | Nov. 17, 1959 |
| 2,920,903 | Locker | Jan. 12, 1960 |

FOREIGN PATENTS

| | | |
|---|---|---|
| 559,577 | Belgium | Aug. 14, 1957 |